United States Patent [19]

Lausberg et al.

[11] Patent Number: 4,879,324

[45] Date of Patent: Nov. 7, 1989

[54] THERMOPLASTIC MOLDING COMPOSITIONS BASED ON POLYCARBONATES, POLYESTERS AND POLYAMIDES

[75] Inventors: Dietrich Lausberg; Erhard Seiler, both of Ludwigshafen; Hans-Georg Braun, Gruenstadt-Sausenheim, all of Fed. Rep. of Germany

[73] Assignee: BASF Aktiengesellschaft, Ludwigshafen, Fed. Rep. of Germany

[21] Appl. No.: 311,392

[22] Filed: Feb. 16, 1989

Related U.S. Application Data

[63] Continuation of Ser. No. 127,035, Nov. 27, 1987, abandoned.

[30] Foreign Application Priority Data

Nov. 29, 1986 [DE] Fed. Rep. of Germany ....... 3640875

[51] Int. Cl.$^4$ .................. C08L 77/00; C08L 67/00; C08L 63/00
[52] U.S. Cl. .................... 523/400; 523/436; 523/466; 525/66; 525/67; 525/109; 525/133; 525/423; 525/425; 525/166
[58] Field of Search .............. 523/400, 436, 466; 524/513, 537, 509, 504, 514, 538, 539; 525/166, 425, 66, 67, 107, 133, 146, 109, 423

[56] References Cited

U.S. PATENT DOCUMENTS

| | | | |
|---|---|---|---|
| 3,714,722 | 2/1973 | Bhakuni | 525/425 |
| 4,636,544 | 1/1987 | Hepp | 524/513 |

FOREIGN PATENT DOCUMENTS

| | | | |
|---|---|---|---|
| 0025920 | 4/1981 | European Pat. Off. | |
| 0114288 | 8/1984 | European Pat. Off. | |
| 0044141 | 4/1985 | European Pat. Off. | |
| 2751969 | 6/1978 | Fed. Rep. of Germany | |
| 7120268 | 6/1971 | Japan | 525/425 |
| 113049 | 6/1984 | Japan | 524/537 |
| 1450321 | 9/1976 | United Kingdom | |
| 1475562 | 6/1977 | United Kingdom | |
| 1496018 | 12/1977 | United Kingdom | |
| WO8000972 | 5/1980 | World Int. Prop. O. | |

Primary Examiner—John C. Bleutge
Assistant Examiner—David Buttner
Attorney, Agent, or Firm—Oblon, Spivak, McClelland, Maier & Neustadt

[57] ABSTRACT

Thermoplastic molding compositions contain as essential components
(A) from 1 to 90% by weight of a polycarbonate,
(B) from 1 to 90% by weight of a polyester,
(C) from 1 to 90% by weight of a polyamide,
(D) from 0.5 to 30% by weight of a polymeric component having hydroxyl groups and in addition
(E) from 0 to 30% by weight of an impact-modifying rubber and
(F) from 0 to 60% by weight of a fibrous or particulate filler.

11 Claims, No Drawings

THERMOPLASTIC MOLDING COMPOSITIONS BASED ON POLYCARBONATES, POLYESTERS AND POLYAMIDES

This application is a continuation of application Ser. No. 127,035 filed on Nov. 27, 1987 now abandoned.

The present invention relates to thermoplastic molding compositions containing as essential components (A) from 1 to 90% by weight of a polycarbonate,
(B) from 1 to 90% by weight of a polyester,
(C) from 1 to 90% by weight of a polyamide,
(D) from 0.5 to 30% by weight of a polymeric component having hydroxyl groups and in addition
(E) from 0 to 30% by weight of an impact-modifying rubber and
(F) from 0 to 60% by weight of a fibrous or particulate filler.

The present invention further relates to the use of such a molding composition for producing a molding, and to a molding containing this molding composition as an essential component.

Molding compositions based on polycarbonates and polyesters are known and described for example in DE-A No. 2,417,002 EP-A No. 25,920, WO 80/972 and EP-A No. 114,288. These mixtures show good impact strength even at low temperatures; however, they are difficult to process.

Molding compositions of polyesters and polyamides are likewise known per se, for example from DE-A No. 2,307,895, DE-A No. 2,350,852 and EP-A No. 44,141. However, the mechanical properties of these molding composition are not satisfactory.

DE-A No. 2,751,969 discloses molding compositions of polycarbonates and polyesters, which are stabilized by the presence of small amounts of polyamides. The preferred amount of polyamide ranges from 0.5 to 3% by weight. The mechanical properties of the mixtures deteriorate with increasing polyamide content. Nor are the processibility and heat distortion resistance of such molding compositions satisfactory.

It is an object of the present invention to provide molding compositions based on polycarbonates, polyesters and polyamides, which, in addition to a high impact strength even at low temperatures, a good stress crack resistance and a good heat distortion resistance, also show a very good processing stability.

We have found that this object is achieved by the molding composition defined at the beginning.

The polycarbonates (A) contained in the molding compositions according to the invention are known per se. They are obtainable for example as described in DE-B No. 1,300,266 by interface polycondensation or as described in DE-A No. 1,495,730 by reaction of biphenyl carbonate with a bisphenol. The preferred bisphenol is 2,2-di(4-hydroxyphenyl)propane, which in general, and also hereinafter, is referred to as bisphenol A.

Instead of bisphenol A it is also possible to use other aromatic dihydroxy compounds, in particular 2,2-di(4-hydroxyphenyl)pentane, 2,6-dihydroxynaphthalene, 4,4'-dihydroxydiphenyl sulfone, 4,4'-dihydroxydiphenyl ether, 4,4'-dihydroxydiphenyl sulfite, 4,4'-dihydroxydiphenyl methane, 1,1-di(4-hydroxyphenyl)ethane or 4,4-dihydroxydiphenyl, and also mixtures thereof.

Particularly preferred polycarbonates are those based on bisphenol A or bisphenol A together with up to 30 mol % of the aforementioned aromatic dihydroxy compounds.

The relative viscosity of these polycarbonates is in general within the range from 1.2 to 1.5, in particular from 1.28 to 1.4 (measured at 25° C. in a 0.5% strength by weight solution in dichloromethane).

The proportion of polycarbonate A in the molding composition according to the invention ranges from 1 to 90, preferably from 2 to 80, in particular from 5 to 70, % by weight.

The polyester (B) contained in the molding composition according to the invention are known per se and described in the literature. In the main chain they contain an aromatic ring due to an aromatic dicarboxylic acid. The aromatic ring can also be substituted, for example by halogen, such as chlorine or bromine, or by $C_1$–$C_4$-alkyl, such as methyl, ethyl, i- or n-propyl, or n-, i- or t-butyl.

The polyesters can be prepared in a conventional manner by reacting aromatic dicarboxylic acids, esters thereof or other ester-forming derivatives thereof with aliphatic dihydroxy compounds.

Preferred dicarboxylic acids are naphthalenedicarboxylic acid, terephthalic acid and isophthalic acid or mixtures thereof. Up to 10 mol % of the aromatic dicarboxylic acids can be replaced by aliphatic or cycloaliphatic dicarboxylic acids such as adipic acid, azaleic acid, sebacic acid, dodecanedioic acids and cyclohexanedicarboxylic acids.

Of the aliphatic dihydroxy compounds, preference is given to diols of 2 to 6 carbon atoms, in particular 1,2-ethanediol, 1,4-butanediol, 1,6-hexanediol, 1,4-hexanediol, 1,4-cyclohexanediol and neopentyl glycol or mixtures thereof.

Particularly preferred polyester B are polyalkylene terephthalates derived from alkanediols of 2 to 6 carbon atoms. Of these, preference is given in particular to polyethylene terephthalate and polybutylene terephthalate.

The relative viscosity of the polyester (B) is in general within the range from 1.2 to 1.8 (measured in a 0.5% strength by weight solution in a phenol/o-dichlorobenzene mixture (weight ratio 1:1) at 25° C.).

The proportion of polyester B in the molding composition according to the invention ranges from 1 to 90% by weight based on the total weight. Molding compositions containing from 10 to 60, in particular 12 to 50, by weight of polyester are preferred.

Component C of the thermoplastic molding composition according to the invention is a polyamide or a mixture of two or more polyamides. In principle, both partially crystalline and amorphous polyamides are suitable, but preference is given to partially crystalline polyamides since the molding compositions produced therefrom are generally superior to those based on amorphous polyamides in respect of heat distortion and stress crack resistance. Polyamides which are usable according to the invention are known per se and include for example polyamides having molecular weights of 5000 or more, as described for example in U.S. Pat. Nos. 2,071,250, 2,071,251, 2,130,523, 2,130,948, 2,241,322, 2,312,966, 2,512,906 and 3,393,210.

The polyamides can be prepared for example by condensing equimolar amounts of a saturated dicarboxylic acid of from 4 to 12 carbon atoms with a diamine of from 4 to 14 carbon atoms, or by condensing Ω-aminocarboxylic acids, or by polyaddition of lactams. Examples of polyamides are polyhexamethyleneadipamide (nylon 66), polyhexamethyleneazelamide (nylon 69), polyhexamethylenesebacamide (nylon 610), polyhexamethylenedodecanediamide (nylon 612), polyamides obtained by decyclization of lactams, such as polycaprolactam or polylaurolactam, poly-11-aminoundecanoic acid and di(p-aminocyclohexyl)methanedodecanediamide. It is also possible according to the invention to use polyamides which have been prepared by copolycondensation of two or more of the abovementioned polymers or their components, for example a copolymer of adipic acid, isophthalic acid and hexamethylenediamine. Preferably, the polyamides are linear and have melting points of more than 200° C.

Preferred polyamides are polyhexamethyleneadipamide, polyhexamethylenesebacamide and polycaprolactam. The polyamides generally have a relative viscosity of from 2.0 to 5, determined in a 1% strength by weight solution in $H_2SO_4$ at 23° C., which corresponds to a molecular weight (weight average) of from about 15000 to 45000. It is of course also possible to use mixtures of polyamides.

The proportion of polyamide C in the molding composition according to the invention ranges from 1 to 30% by weight, based on the total weight. Molding compositions containing from 10 to 60, in particular from 12 to 50, % by weight of polyamide are particularly preferred.

The essential component D of the molding composition according to the invention is a polymeric component having hydroxyl groups. The experiments which have been carried out showed that, although in principle any group having proton donor properties should be suitable, groups having the structural unit —OH are particularly highly suitable. The compatibility-improving activity of component D is in all probability due to the fact that there are interactions between component D and components A, B and C, for example H bonds, which ensure better interphase adhesion.

As already mentioned, in principle any polymer having hydroxyl groups which are substantially freely accessible is suitable. It is of course necessary to ensure that components A, B and C are stable to component D. This is important in particular if compounds having acid —OH groups are used.

Having regard to these prerequisites, some groups of compounds, which are described hereinafter, have proven to be particularly advantageous. However, in principle it is also possible to use other components D as long as this does not impair the stability of components A, B and C.

The first group of particularly suitable polymers is that comprising the polycondensates of aliphatic or aromatic diols or more highly hydric alcohols with epihalohydrins. Compounds of this type and processes for preparing same are known to those skilled in the art, rendering further details superfluous. Aliphatic and aromatic diols are equally suitable. Particularly preferred dihydroxy compounds are the diols used for preparing polycarbonates.

On account of easy accessibility, preference is given to using a polycondensate formed from bisphenol A and epichlorohydrin and having the structure

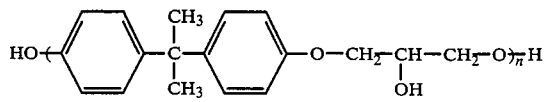

In addition to the possibility of using polymers which already have the hydroxyl group in the main chain, it is also possible to use polymers or copolymers which receive these functional groups in the course of the polymerization by the presence of suitable monomers, in which case the groups can then likewise be present in the main chain of the polymer or, indeed, in substituents on the main chain. A further possibility comprises grafting suitable monomers having OH groups onto graft bases, which in principle can be any polymer not completely incompatible with components A, 8 and C. A certain degree of incompatibility can be made up for by increasing the hydroxyl content.

Suitable components D are therefore for example polymers based on polyolefins, polystyrene and rubber elastomers having hydroxyl (—OH) groups which are obtainable either by using suitable comonomers or, alternatively, by grafting on the functional —OH groups. The proportion of comonomer or graft monomer having hydroxyl groups is dependent on how compatible the base polymer is with components A, B and C. The higher the compatibility, the lower the proportion of OH groups can be. It follows from the above that a large number of polymers are suitable for use as component D, of which some particularly preferred types are presented hereinafter, purely, by way of example.

The first group comprises polymers and copolymers containing up to 100 mol % of vinylphenylcarbinols, of which vinylphenyldimethylcarbinols and in particular vinylphenylhexafluorodimethylcarbinol have proven particularly suitable. Suitable base polymers or graft bases are again advantageously the aforementioned types of polymers.

The second group consists of polymers of vinylphenols and copolymers of the aforementioned base polymers with vinylphenols, which may also contain substituents in the nucleus. Substituents which increase the acidity of phenolic hydrogen are particularly suitable, for example halogen substituents, but other electron-attracting substituents also.

A third group consists of phenol-formaldehyde polycondensates provided they are uncrosslinked and soluble. These products can be linear or branched.

In addition it is possible in principle to specify the polymers and copolymers formed with any polymerizable or graftable alcohol.

It is worth mentioning that polymers having OH hydroxyl groups and based on polycarbonates, polyesters or polyamides are particularly preferred, since in this case compatibility with at least component A, B or C is present from the outset, so that the proportion of OH groups can be reduced.

The preparation of component D can be effected in a conventional polycondensation or graft or copolymerization, rendering further details superfluous.

The proportion of component D in the molding composition according to the invention is within the range from 0.1 to 30% by weight, based on the total weight of components A to D, and depends on the compatibility of the base polymer with components A, B and C. In general, proportions of from 1 to 25, in particular from 2 to 20, % by weight have proven particularly advantageous.

In addition to components A to D, a molding composition according to the invention may contain impact-modifying rubbers as component E to improve the impact strength. Impact strength improving elastomers (rubbers) for polyamides, polyesters and polycarbonates are known per se to those skilled in the art.

Examples of rubbers are those based on ethylene, propylene, butadiene or acrylate and mixtures thereof.

Polymers of this type are described for example in Houben-Weyl, Methoden der organischen Chemie, volume 14/1 (Georg-Thieme-Verlag, Stuttgart, 1961), pages 392 to 406, and in the monograph by C. B. Bucknall entitled Toughened Plastics (Applied Science Publishers, London, 1977).

In what follows, some preferred types of such elastomers are presented.

A first preferred group consists of the ethylenepropylene monomer (EPM) and ethylene-propylenediene monomer (EPDM) rubbers, which preferably have a ratio of ethylene radicals : propylene radicals within the range from 40:60 to 65:35.

The Mooney viscosities (MLI+4/100° C.) of such uncrosslinked EPM and EPDM rubbers (gel contents in general below 1% by weight) are preferably within the range from 25 to 100, in particular from 35 to 90 (measured in accordance with DIN 53523 on the larger rotor after a 4 minute run at 100° C.).

EPM rubbers generally have almost no double bonds left, while EPDM rubbers can have from 1 to 20 double bonds per 100 carbon atoms.

Examples of suitable diene monomers for EPDM rubbers are conjugated dienes such as isoprene and butadiene, unconjugated dienes of from 5 to 25 carbon atoms, such as buta-1,4-diene, hexa-1,4-diene, hexa-1,5-diene, 2,5-dimethylhexa-1,5-diene and octa-1,4-diene, cyclic dienes such as cyclopentadiene, cyclohexadienes, cyclooctadienes and dicyclopentadiene, and also alkenylnorbornenes such as 5-ethylidene-2-norbornene, 5-butylidene-2-norbornene, 2-methylallyl-5-norbornene and 2-isopropenyl-5-norbornene, and tricyclodienes such as 3-methyltricyclo[5.2.1.0.2.6]-3,8-decadiene or mixtures thereof. Preference is given to hexa-1,5-diene, 5-ethylidene-2-norbornene and dicyclopentadiene. The diene content of the EPDM rubber preferably ranges from 0.5 to 10, in particular from 1 to 8, % by weight, based on the total weight of the rubber.

EPM and EPDM rubbers may also be grafted with reactive carboxylic acids or derivatives thereof. These are, by way of example, acrylic acid, methacrylic acid and derivatives thereof and also maleic anhydride.

A further group of preferred rubbers are copolymers of ethylene with acrylic and/or methacrylic esters, in particular those which additionally contain epoxy groups. These epoxy groups are preferably incorporated into the rubber by adding epoxy-containing monomers of the general formula II or III to the monomer mixture

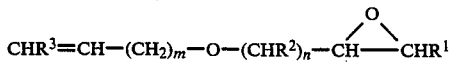  (II)

-continued

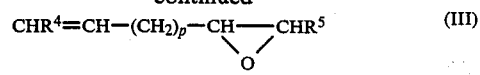  (III)

where $R^1$, $R^2$, $R^3$, $R^4$ and $R^5$ are each hydrogen or alkyl of 1 to 6 carbon atoms, m is an integer from 0 to 20, n is an integer from 0 to 10 and p is an integer from 0 to 5.

Preferably, $R^1$, $R^2$ and $R^3$ are each hydrogen, m is 0 or 1 and n is 1. The corresponding compounds are alkyl glycidyl ethers or vinyl glycidyl ethers.

Preferred examples of compounds of the formula II are the epoxy-containing esters of acrylic acid and/or methacrylic acid, of which in turn glycidyl acrylate and glycidyl methacrylate are particularly preferred.

The ethylene content of the copolymers is in general within the range from 50 to 98% by weight, and the proportions of epoxy-containing monomers and acrylic and/or methacrylic esters are each within the range from 1 to 49% by weight.

Particular preference is given to copolymers of from 50 to 98, in particular from 60 to 95, % by weight of ethylene, from 1 to 40, in particular from 2 to 20, % by weight of glycidyl acrylate and/or glycidyl methacrylate and from 1 to 45, in particular from 10 to 35, % by weight of n-butyl acrylate and/or 2-ethylhexyl acrylate.

Further preferred esters of acrylic and/or methacrylic acid are the methyl, ethyl, propyl and i- or t-butyl esters. Even acrylic acid and methacrylic acid themselves can be used with advantage.

In addition it is also possible to use vinyl esters and vinyl ethers as comonomers.

The ethylene copolymers described above can be prepared in a conventional manner, preferably by random copolymerization under high pressure and at elevated temperatures. Suitable processes are described in the literature.

The melt index of the ethylene copolymers is generally within the range from 1 to 80 g/10 min (measured at 190° C. under a 2.16 kg load).

Preferred elastomers (rubbers D) also include graft copolymers with butadiene, butadiene/styrene, butadiene/acrylonitrile and acrylic esters as described for example in DE-A No. 1,694,173 and DE-A No. 2,348,377.

Noteworthy among these are in particular the ABS polymers described in DE-A No. 2,035,390, DE-A No. 2,248,242 and EP-A No. 22,216, the latter being particularly preferred.

Rubber D can also be a graft polymer of from 25 to 98% by weight of an acrylate rubber having a glass transition temperature of below −20° C., as graft base, and from 2 to 75% by weight of a copolymerizable ethylenically unsaturated monomer whose homo- and copolymers have a glass transition temperature of more than 25° C., as graft add-on.

The graft base comprises acrylate or methacrylate rubbers with up to 40% by weight of further comonomers. The $C_1$–$C_8$-esters of acrylic or methacrylic acid and the halogenated derivatives thereof and also aromatic acrylic esters and mixtures thereof are preferred. Suitable comonomers for use in the graft base are acrylonitrile, methacrylonitrile, styrene, α-methylstyrene, acrylamides, methacrylamides and vinyl $C_1$–$C_6$-alkyl ethers.

The graft base can be uncrosslinked or partially or completely crosslinked. The crosslinking is obtained by copolymerization of preferably from 0.02 to 5% by weight, in particular from 0.05 to 2% by weight, of a crosslinking monomer having more than one double bond. Suitable crosslinking monomers are described for example in DE-A No. 2,726,256 and EP-A No. 50,265.

Preferred crosslinking monomers are triallyl cyanurate, triallyl isocyanurate, triacryloylhexahydro-s-triazine and trialkylbenzenes.

If the crosslinking monomers have more than 2 polymerizable double bonds, it is advantageous to restrict their amount to not more than 1% by weight, based on the graft base.

Particularly preferred graft bases are emulsion polymers having a gel content of more than 60% by weight (determined in dimethylformamide at 25° C. as described in M. Hoffmann, H. Krömer, R. Kuhn, Polymeranalytik, Georg-Thieme-Verlag, Stuttgart, 1977).

Other suitable graft bases are acrylate rubbers having a diene core as described for example in EP-A No. 50,262.

Suitable graft monomers are in particular styrene, α-methylstyrene, acrylonitrile, methacrylonitrile and methyl methacrylate or mixtures thereof, in particular those of styrene and acrylonitrile in a weight ratio of from 90/10 to 50/50.

The graft yield, i.e. the ratio of the amount of monomer grafted on and the amount of graft monomer used, is in general within the range from 20 to 80%.

Acrylate rubbers which can be used according to the invention are described for example in DE-A No. 2,444,584 and DE-A No. 2,726,256.

The rubbers E preferably have a glass transition temperature of less than −30° C., in particular of less than −40° C., which leads to good impact strength even at low temperatures.

It will be readily understood that it is also possible to use mixtures of the aforementioned types of rubber.

Suitable reinforcing fillers F are for example asbestos, carbon and preferably glass fibers, the glass fibers being used for example in the form of glass fabrics or mats (including surfacing mats) and/or preferably glass rovings or cut glass filaments made of low-alkali E glasses from 5 to 200 μm, preferably from 8 to 15 μm, in diameter, and having after incorporation an average length of from 0.05 to 1 mm, preferably from 0.1 to 0.5 mm.

Other suitable fillers are for example wollastonite, calcium carbonate, glass balls, quartz powder, silicon nitride, boron nitride, amorphous silica, asbestos, calcium silicate, calcium metasilicate, magnesium carbonate, kaolin, chalk, mica and feldspar or mixtures thereof.

Of the aforementioned reinforcing fillers glass fibers in particular have proven advantageous, in particular when a very high heat distortion resistance is required.

The proportion of component F is from 0 to 60, preferably from 2 to 50, in particular from 5 to 30, % by weight, based on the total weight of the molding composition.

In addition to components A to F, the molding composition according to the invention can also contain customary additives and processing aids. The proportion is in general up to 0, preferably up to 50, % by weight, based on the total weight of components A to F.

Customary additives are for example stabilizers and oxidation retardants, agents to prevent heat decomposition and decomposition by ultraviolet light, lubricants, mold release agents, colorants, such as dyes and pigments, nucleating agents and plasticizers.

Oxidation retardants and heat stabilizers which may be added to a thermoplastic composition according to the invention are for example halides of metals of group I of the periodic table, for example sodium halides, potassium halides or lithium halides, with or without copper(I) halides, for example chlorides, bromides or iodides. It is also possible to use sterically hindered phenols, hydroquinones, substituted representatives of this group and mixtures thereof, preferably in concentrations of up to 1% by weight, based on the weight of the mixture.

Examples of UV stabilizers are various substituted resorcinols, salicylates, benzotriazoles and benzophenones, which in general are used in amounts of up to 2.0% by weight.

Lubricants and mold release agents, which in general are added to the thermoplastic composition in amounts of up to 1% by weight, are stearic acids, stearyl alcohol, stearic esters and amides and the fatty acid esters of pentaerythritol.

It is also possible to add organic dyes, such as nigrosine, pigments, for example titanium dioxide, cadmium sulfide, cadmium sulfide selenide, phthalocyanines, ultramarine blue or carbon black. Nucleating agents, such as talc, calcium fluoride, sodium phenylphosphinate, alumina or finely divided polytetrafluoroethylene, can be employed in amounts of up to for example 5% by weight, based on components A to F.

The molding composition according to the invention can be prepared in a conventional mixing process, for example by incorporating polyesters and polycarbonates into the polyamide at temperatures above the melting point the components, in particular at from 250° to 350° C., in particular at from 250° to 290° C., in conventional mixing apparatus, such as extruders, kneaders and mixers. Components E and F, which are facultative, are added in an appropriate manner.

The molding compositions according to the invention can easily be processed into moldings having good surface properties and improved impact strength coupled with high stiffness, in particular at low temperatures. There is no demixing of the polymer components either in the molding or in the melt.

EXAMPLES

To prepare thermoplastic molding compositions according to the invention use is made of the following starting materials.

Component A (polycarbonate)
Polycarbonate based on bisphenol A having a relative viscosity of 1.36, measured in a 0.5% strength by weight solution in dichloromethane at 25° C.

Component B (polyester)
$B_1$: Polyethyleneterephthalate having a relative viscosity of 1.38 (measured in a 0.5% strength by weight solution in phenol/o-dichlorobenzene in a weight ratio of 1:1).
$B_2$: Polybutyleneterephthalate having a relative viscosity of 1.6, measured like $B_1$.

Component C (polyamides):
$C_1$: Polyhexamethyleneadipamide having a relative viscosity of 3.31, measured in a 1% strength solution in 96% $H_2SO_4$ at 25° C.
$C_2$: Polycaprolactam having a relative viscosity of 4.0 (measured like $C_1$)

C$_3$: Polyhexamethylenesebacamide having a relative viscosity of 3.23 (measured like C$_1$)

C$_4$: Polyamide prepared from hexamethylenediamine and a mixture of isophthalic acid and terephthalic acid (weight ratio 60/40) having a relative viscosity of 1.91 measured in a 1% strength by weight solution in concentrated sulfuric acid at 25° C.

Component D:

D: Polycondensate from 2,2-di(4-hydroxyphenyl)propane and epichlorohydrin (Phenoxy ™, Union Carbide) having a relative viscosity of 1.13, measured in a 0.5% strength by weight solution of dichloromethane at 25° C.

Structure:

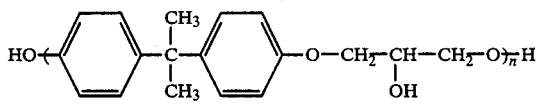

Component E:

To improve the impact strength, the following rubbers were used:

E$_1$: Graft rubber having a graft base (75% by weight) of poly-n-butyl acrylate reacted with butanediol diacrylate, and a graft sheath (25% by weight) of a copolymer of styrene and acrylonitrile (weight ratio 75:25) prepared by emulsion polymerization in a conventional manner. (Average particle size d$_{50}$=250 nm).

E$_2$: Graft rubber having a graft base of polybutadiene (75%) and a graft sheath (25%) of a copolymer of styrene and acrylonitrile (weight ratio 75:25) prepared by emulsion polymerization in a conventional manner. (d$_{50}$=250 nm).

E$_3$: Terpolymer from ethylene, n-butyl acrylate and acrylic acid (weight ratio 65/30/5) prepared by high pressure polymerization in a conventional manner. (MFI melt flow index=10 g/10 min (190° C., 2.16 kg)).

E$_4$: Copolymer of ethylene/n-butyl acrylate/glycidyl methacrylate (weight ratio 67/30/3) having a glass transition temperature of −48° C.

The average particle diameter d50 is that diameter which bisects the particle size distribution in such a way that the diameters of 50% by weight of the particles are above it and below it respectively.

Component F

Glass fibers of type R20EX4 (from OCF)

The molding compositions were prepared by thoroughly mixing the components and, in a twin-screw extruder, melting the mixture at 260° C., homogenizing the melt and extruding it into a waterbath. After granulation and drying, the mixture was molded in an injection molding machine into test specimens, which were investigated without further aftertreatment.

The results are shown in Tables 1 and 2 below.

The hole impact strength was determined in accordance with German Standard Specification DIN 53753, the impact strength in accordance with DIN 53453, the tensile strength in accordance with DIN 53455 and the modulus of elasticity in accordance with DIN 53457. The heat distortion resistance is reported in terms of the Vicat-B temperature measured in accordance with DIN 53460.

The results show that by adding component D the impact strength or hole impact strength of blends of polycarbonates, polyesters and polyamides can be substantially increased.

TABLE 1

(all quantities in % by weight)

| Example No. | A | B | C | D | E | Hole impact strength kJ/m$^2$ 23° C. | Hole impact strength kJ/m$^2$ −40° C. | Vicat B[2] °C. | Self-color |
|---|---|---|---|---|---|---|---|---|---|
| 1V[1] | 50 | 50 B$_1$ | — | — | — | 23 | 15 | 138 | yellow |
| 2V | 50 | | 50 C$_2$ | — | — | 9 | 5 | 145 | white[3] |
| 3V | 34 | 33 B$_1$ | 33 C$_2$ | — | — | 9 | 6 | 148 | yellow |
| 4V | 34 | 33 B$_1$ | 33 C$_3$ | — | — | 8 | 7 | 136 | brown |
| 5 | 30 | 30 B$_1$ | 30 C$_2$ | 10 | — | 90 | 30 | 138 | white |
| 6 | 50 | 20 B$_1$ | 20 C$_2$ | 10 | — | 93 | 55 | 137 | white |
| 7 | 58 | 20 B$_1$ | 20 C$_2$ | 5 | 5 E$_4$ | 90 | 63 | 135 | white |
| 8 | 50 | 20 B$_1$ | 20 C$_3$ | 5 | 5 E$_4$ | 102 | 69 | 134 | white |
| 9 | 50 | 20 B$_1$ | 20 C$_1$ | 5 | 5 E$_4$ | 81 | 53 | 140 | white |
| 10 | 50 | 40 B$_1$ | 20 C$_4$ | 5 | 5 E$_4$ | 75 | 40 | 141 | white |
| 11 | 20 | 50 B$_1$ | 20 C$_2$ | 10 | — | 88 | 27 | 131 | white |
| 12 | 20 | 50 B$_2$ | 20 C$_3$ | 10 | — | 95 | 39 | 129 | white |
| 13 | 70 | 10 B$_1$ | 10 C$_2$ | 10 | — | 101 | 93 | 141 | white |
| 14 | 30 | 30 B$_2$ | 30 C$_3$ | 10 | — | 93 | 41 | 128 | white |

[1]V = comparative test
[2]measured parameter for heat distortion resistance
[3]was found to foam in the course of production

TABLE 2

(all quantities in % by weight)

| Example No. | A | B | C | D | E | F | Impact strength acc. to DIN 53453 (kJ/m$^2$) 23° C. | Tensile strength acc. to DIN 53455 (N/mm$^2$) | Modulus of elasticity acc. to DIN 53457 (N/mm$^2$) |
|---|---|---|---|---|---|---|---|---|---|
| 15V[1] | 25 | 25 B$_1$ | 25 C$_2$ | — | — | 25 | 13 | 139 | 8300 |
| 16V | 25 | 25 B$_2$ | 25 C$_2$ | — | — | 25 | 15 | 141 | 8200 |
| 17V | 25 | 25 B$_1$ | 25 C$_1$ | — | — | 25 | 11 | 143 | 8400 |
| 18 | 25 | 20 B$_1$ | 25 C$_2$ | 5 | — | 25 | 28 | 148 | 8600 |
| 19 | 25 | 20 B$_2$ | 25 C$_1$ | 5 | — | 25 | 33 | 146 | 8500 |
| 20 | 25 | 20 B$_1$ | 25 C$_1$ | 5 | — | 25 | 30 | 150 | 8500 |
| 21 | 20 | 30 B$_1$ | 20 C$_3$ | 5 | — | 25 | 31 | 151 | 8700 |

TABLE 2-continued

| | | | | | | | Impact strength acc. to DIN 53453 ($kJ/m^2$) | Tensile strength acc. to DIN 53455 ($N/mm^2$) | Modulus of elasticity acc. to DIN 53457 ($N/mm^2$) |
|---|---|---|---|---|---|---|---|---|---|
| Example No. | A | B | C | D | E | F | 23° C. | | |
| 22 | 15 | 30 $B_1$ | 20 $C_2$ | 5 | 5 $E_1$ | 25 | 35 | 140 | 7900 |
| 23 | 15 | 30 $B_1$ | 20 $C_2$ | 5 | 5 $E_2$ | 25 | 39 | 138 | 7800 |
| 24 | 15 | 30 $B_1$ | 20 $C_2$ | 5 | 5 $E_3$ | 25 | 36 | 138 | 8000 |
| 25 | 15 | 30 $B_1$ | 20 $C_2$ | 5 | 5 $E_4$ | 25 | 37 | 139 | 8000 |

[1]V = comparative test

We claim:

1. A thermoplastic molding composition containing as essential components
   (A) from 1 to 90% by weight of a polycarbonate,
   (B) from 1 to 90% by weight of a polyester,
   (C) from 1 to 90% by weight of a polyamide,
   (D) from 0.5 to 30% by weight of a polymeric component having substantially freely accessible hydroxyl groups, which polymeric component is
      (1) a polycondensate of an aliphatic or aromatic diol or polyol with an epihalohydrin,
      (2) a polyolefin, polystyrene or rubber elastomer, each having freely accessible hydroxyl groups,
      (3) a polymer or copolymer containing a vinylphenylcarbinol,
      (4) a polymer or copolymer containing a vinylphenol, or
      (5) a phenol-formaldehyde polycondensate, which polymeric component is not identical to component (A), (B) or (C), and in addition
   (E) from 0 to 30% by weight of an impact-modifying rubber and
   (F) from 0 to 60% by weight of a fibrous or particulate filler.

2. A thermoplastic molding composition as claimed in claim 1, containing from 1 to 25% by weight of said impact-modifying rubber.

3. A thermoplastic molding composition as claimed in claim 1, containing from 2 to 50% by weight of said fibrous or particulate filler.

4. A molding prepared from, as an essential component, a molding composition as claimed in claim 1.

5. A thermoplastic molding composition, as claimed in claim 1, wherein said polymeric component having substantially freely accessible hydroxyl groups is a polycondensate of an aliphatic or aromatic diol or polyol with an epihalohydrin.

6. A thermoplastic molding composition, as claimed in claim 5, wherein said polycondensate is of 2,2-di(4-hydroxyphenyl) propane with epichlorohydrin.

7. A thermoplastic molding composition, as claimed in claim 1, wherein said polymeric component having substantially freely accessible hydroxyl groups is a polymer or copolymer receiving hydroxyl groups during polymerization in the presence of a hydroxyl group-containing monomer.

8. A thermoplastic molding composition, as claimed in claim 1, wherein said polymeric component having substantially freely accessible hydroxyl groups is a polyolefin, polystyrene or rubber elastomer, each having freely accessible hydroxyl groups.

9. A thermoplastic molding composition, as claimed in claim 1, wherein said polymeric component having substantially freely accessible hydroxyl groups is a polymer or copolymer containing a vinylphenylcarbinol.

10. A thermoplastic molding composition, as claimed in claim 1, wherein said polymeric component having substantially freely accessible hydroxyl groups is a polymer or copolymer containing a vinylphenol.

11. A thermoplastic molding composition, as claimed in claim 1, wherein said polymeric component having substantially freely accessible hydroxyl groups is a phenol-formaldehyde polycondensate.

* * * * *